United States Patent [19]

Ehrlinger et al.

[11] 4,200,006

[45] Apr. 29, 1980

[54] GEAR-CHANGE TRANSMISSION WITH DIFFERENTIAL

[75] Inventors: Friedrich Ehrlinger, Friedrichshafen; Anton Ott, Tettnang, both of Fed. Rep. of Germany

[73] Assignee: Zahnradfabrik Friedrichshafen AG, Friedrichshafen, Fed. Rep. of Germany

[21] Appl. No.: 898,811

[22] Filed: Apr. 24, 1978

[30] Foreign Application Priority Data

Apr. 27, 1977 [DE] Fed. Rep. of Germany ....... 2718652

[51] Int. Cl.² ..................... F16H 37/06; F16H 1/44
[52] U.S. Cl. ........................ 74/681; 74/682; 74/710.5; 74/740; 74/714; 74/720.5; 74/665 A
[58] Field of Search ............... 74/681, 682, 665 R, 74/665 F, 665 K, 700, 701, 705, 753, 758, 714, 710.5, 710, 720.5, 665 A, 740

[56] References Cited

U.S. PATENT DOCUMENTS

| 2,930,257 | 3/1960 | Christenson | 74/681 X |
| 3,096,666 | 7/1963 | Christenson et al. | 74/740 X |
| 3,377,885 | 4/1968 | Tuck et al. | 74/705 X |
| 3,487,723 | 1/1970 | Piot | 74/682 |

*Primary Examiner*—Leslie Braun
*Assistant Examiner*—Frank McKenzie
*Attorney, Agent, or Firm*—Karl F. Ross

[57] ABSTRACT

A gear-change transmission in which the input shaft is connected to one element of a pair of planetary gear sets together forming a differential distributing the output between two shafts. One element of each of the planetary gear sets is connected to a coupling shaft which can be braked for reversal of the transmission output while another two elements of the planetary gears are coupled together and to one of the output shafts. The remaining element of the second set is connected to the remaining input shaft and a clutch can be energized to block the differential and effectively couple all of these shafts together. The output shafts are selectively coupled to a further shaft through positive gearing upon actuation of switching clutches.

10 Claims, 3 Drawing Figures

GEAR-CHANGE TRANSMISSION WITH DIFFERENTIAL

FIELD OF THE INVENTION

The present invention relates to a gear-change transmission and, more particularly, to a speed-changing gear transmission for automotive vehicles and the like having a differential drive.

BACKGROUND OF THE INVENTION

There are gear-change transmissions which can be described as differential-splitter transmissions in which the differential gearing is interposed between steps of the force-transmitting gearing defining the transmission ratios for the "speeds", "gears" or ratios of input and output torques, etc.

In German open application DT OS No. 24 52 335, for example, a transmission of this type has been described in which the differential is constituted as a planetary gearing with at least one pair of planet gears between the sun gear and the ring gear or hollow shaft. The transmission described in that publication has seven speeds and at each higher speed the gear-change jump is finer, requiring greater precision in the positioning, dimensioning and design of the teeth so that the jump from speed to speed is not uncontrollable.

In direct-drive transmissions in which the input is coupled to the output by a different gear chain for each speed or transmission ratio two such chains may be simultaneously effective and the transfer between them carried out by overlapping actuation and disengagement of clutches or brakes during speed change. The conventional system, with its large number of gears of large numbers of teeth each, predetermined spacing between the axes of the gears and the like has proved to be unsatisfactory.

Still greater differences have been encountered with systems using a single planetary gear set as a differential in combination with a speed-change transmission of the aforedescribed type primarily because of the difficulty in collelating the gear-change transmission with the differential.

OBJECTS OF THE INVENTION

It is the principal object of the present invention to provide a speed-change gear transmission whereby the disadvantages enumerated above are obviated.

It is another object of the invention to improve upon transmissions of the type which have a differential on the input side and a plurality of selectively operable gear trains on the output side for facilitating the transition or jumps between selected speeds and for reversal of the output of the transmission.

SUMMARY OF THE INVENTION

These objects and others which will become apparent hereinafter are attained, in accordance with the present invention, in a transmission of the type in which an input shaft is connected to a differential which splits the input torque between a pair of shafts, each of which can be selectively connected to a further (output) shaft of the transmission by at least one and preferably a plurality of gear trains establishing respective "speeds" of the transmission and actuated by respective switching clutches or brakes.

Unlike systems having only a single planetary-gear set, the present invention provides that the differential is constituted by at least two interconnected planetary gear sets, each of which comprises three differentially rotatable elements, namely, a ring-gear element, a planetary-gear or planet-carrier element and a sun-gear element.

According to the principles of the invention, one of the elements of the first planetary-gear set is connected with one of the elements of the second planetary-gear set by a coupling shaft which can be braked for reversing the sense of rotation of the output of a further shaft. Another element of the first set and of the second set are coupled together and are connected to one of the differential output shafts, the other differential output shaft being connected to the remaining element of the second planetary-gear set while the input shaft is connected to the first planetary-gear set. The brake mentioned previously is effective only for reversing the transmission while a controlled clutch is provided for locking the differential so that all of the shafts thereof rotate together in the same sense. In the system of the present invention the following conditions prevail:

(a) a first shaft is effective as the input shaft or engine-connection shaft for all speeds of the changeable-speed gear transmission;

(b) when the forward speeds operate with power distribution or division via the differential, no reaction element is used or necessary. There is a moment or torque distribution from the first (input) shaft to the second and third shafts in ratios of $1:a\phi/(\phi+1)$ and $1:b\phi/(\phi+1)$, respectively, where $a+b=1$. $\phi$ is the average step jump of the speed-change transmission and the torques at the second and third shafts, i.e. the differential output shafts are in the same sense; and (c) for the rearward drive, the coupling or fourth shaft is braked to constitute a reaction element for the differential.

A differential constituted by a plurality of planetary-gear sets, in accordance with the present invention, can be easily laid out and constructed and the torque distribution to the second and third shafts does not become dependent on the particular structural considerations as is the case with a single planetary set, with appropriate radii of the rotating element and relative rotation speeds can be used and extremely high speeds and small elements can be excluded. Furthermore, a simplified reversal system is provided and the reverse speeds can be equal in number to the forward speeds or a lesser number of reverse speeds can be provided.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
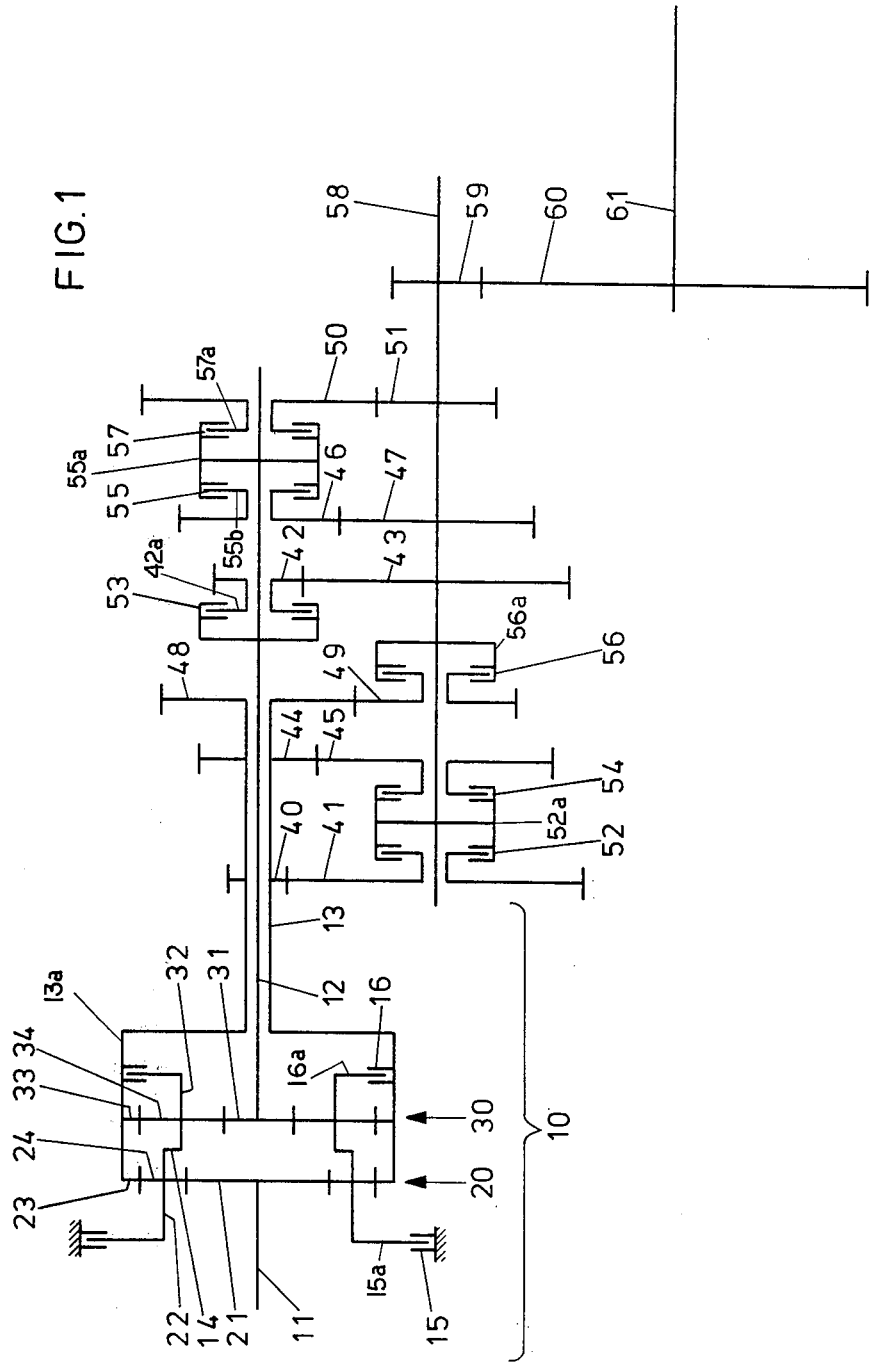
FIG. 1 is a diagram illustrating a gear-change transmission having two planetary-gear sets forming a differential and provided with eleven forward and three reverse speeds as well as an output shaft parallel to the input shaft.

The transmission shown in FIG. 1 comprises a differential 10 consisting of two simple planetary-gear sets 20 and 30, respectively. Each of these planetary-gear sets 20 and 30 comprises a respective sun gear 21 or 31, a respective planetary carrier 22, 32 connected by a shaft 14, planetary wheels 24, 34 on this carrier in mesh with the respective sun gear 21, 31, and respective ring gears 23, 33, connected to a housing 13a forming part of a hollow shaft 13.

More specifically, the input shaft 11, which can be connected to an internal combustion engine for a heavy vehicle, drives directly the sun gear 21 of the first planet set 20, this sun gear driving the planets 24. The planet carrier 22, 32, connected by shaft 14, is provided with a disk 15a which forms part of a brake 15 to be described hereinafter. Naturally, when the brake 15 is engaged, the planet carriers 22 and 32 are immobilized and the ring gear 23 is driven in the opposite sense from sun gear 21 to rotate the shaft 13, the housing 13a and the ring gear 33.

Naturally, when the brake 15 is disengaged, true differential action is permitted between the planet carriers 22, 32 and the ring gears 23, 33 and hence between the shafts 14 and 13.

The sun gear 31 is connected to the shaft 12 which is axially aligned with shaft 11 and is coaxial with shaft 13 while passing through the latter. A further brake 16 can engage a disk 16a on the hollow shaft 14 which is thereby coupled with the planet carriers 22, 32, so that the planet carrier can be locked to the housing 13a by engagement of brake 16.

It will be apparent from the foregoing that a coupling between the two planet sets 20 and 30 is effected by connecting the ring gears 23 and 33 together and to the housing 13a and by connecting the planet carriers 22 and 32 together.

Other possible connections between these planet sets can be made, if desired, without departing from the principles of the present invention. For instance, it is possible to drive the ring gear 23 from the shaft 11, in which case the planet carriers can again be coupled in the manner shown and the sun gears can be connected together and to the respective one of the shafts 12, 13, while the other of these shafts is connected to the ring gear 33.

In a general sense, therefore, each planetary gear set 20 or 30 comprises three differentially rotatable elements, namely, 21, 22, 23 and 31, 32, 33 of which two pairs of elements of the two sets (namely 22, 32 and 23, 33) are connected together, the remaining element 21 of one set 20 being connected to the input shaft and the remaining element 31 of the other set 30 being connected to an output shaft 12 of the differential.

In addition, one of the interconnected pairs of elements (namely 23, 33) is connected to another output shaft of the differential (i.e. shaft 13) while means (16, 16a) is provided for connecting the two pairs of coupled elements together for joint rotation.

The interconnected differential sets 20, 30, collectively represented at 10, have a two-degree limitation in the sense that the speeds of all three of the shafts 11, 12 and 13 can be determined only if the speed of at least two of these shafts is determined. In addition, the differential 10 provides a power distribution whereby an input torque or moment of the shaft 11 is distributed in a predetermined ratio to each of the shafts 12 and 13.

The shaft 12 is connected to a brake housing 53 whose brake disk 42a is connected to a pinion 42 meshing with a pinion 43 keyed to the shaft 58. In addition, the shaft 12 drives a housing 55a with brakes 55 and 57 respectively connected to disks 55b and 57a of gears 46 and 50 meshing with gears 47 and 51 also keyed to the shaft 58. Thus, depending upon the transmission ratios of the gear brakes 42, 43, 46, 47 and 50, 51, selective actuation of brakes 53, 55 and 57 will provide stepwise increase in speeds of the shaft 58 for a given speed of the shaft 12.

The shaft 13, on the other hand, has keyed to it gears 40, 44 and 48 respectively in mesh with gears 41, 45 and 49 which can be selectively coupled by brakes 42, 54 and 56 with housings 52a and 56a tied to the shaft 58. Throughout this description, of course, friction clutches can be used instead of braking devices for the gear-change purposes. These clutches are conveniently designated as switching or shifting clutches. Particularly such clutches may be the elements 52–57 previously described.

The output shaft 58 can deliver the output torque directly to a load or, without altering the principles of the present invention, to a further gear 59 in mesh with a gear 60 on an output shaft 61.

From the foregoing it will be apparent that the second and third shafts 12 and 13 can be connected by respective transmission stages 40, 41; 42, 43; 44, 45; 46, 47; 48, 49 and 50, 51, selectively, by the actuation of the switch clutches 52–57.

The differential drive also has a blocking clutch in the form of the brake-type element 16 previously described and which, in its engaged state, couples the carrier 22, 32 with the housing 13a and the hollow shaft 13. In this state, the differential acts as a single direct torque-transmitting element and the input shaft 11 and the two shafts 12 and 13 all rotate at the same speed in the same sense.

As also has been pointed out, the free shaft 14 can be immobilized by a brake 15 which is effective only during reverse operation of the transmission, i.e. for the reverse speeds.

The functions of the control element for the eleven forward speeds and the three reverse speeds (designated at R) are given in the following table in which X marks the operable clutch or brake for the given conditions:

| Speed | Ratio between Shafts 11 and 12 | Actuated Clutches or Brakes | | | | | | |
|---|---|---|---|---|---|---|---|---|
| | | 15 | 16 | 52 | 54 | 56 | 53 | 55 | 57 |
| 1. | 4.786 | | X | X | | | | | |
| 2. | 3.821 | | | X | | | X | | |
| 3. | 3.050 | | X | | | | X | | |
| 4. | 2.446 | | | | X | | X | | |
| 5. | 1.963 | | X | X | | | | | |
| 6. | 1.567 | | | X | | | | X | |
| 7. | 1.250 | | X | | | | | X | |
| 8. | 1.000 | | | | X | | | X | |
| 9. | 0.800 | | X | | X | | | | |
| 10. | 0.639 | | | | X | | | | X |
| 11. | 0.509 | | X | | | | | | X |
| 1.R | −7.344 | X | X | | | | | | |
| 2.R | −3.012 | X | | | X | | | | |
| 3.R | −1.228 | X | | | | X | | | |

As the foregoing table shows, the blocking clutch 16 is only actuated for the first, third, fifth, seventh, ninth and eleventh forward speeds and is disengaged in all of the remaining speed conditions of the transmission. In the disengaged condition of the blocking clutch 16, the differential 10 works as a splitting transmission which equalizes the speed jump between speeds of uneven speed number.

The table also demonstrates that in each speed, two clutches are engaged and for each speed change one of the previously engaged clutches remains engaged while one is disengaged. This greatly simplifies the clutch actuation for a speed-change operation.

The transmission ratios given in the foregoing table correspond to the following numbers of teeth on the indicated gears:

| Gear No.: | 21 | 23 | 31 | 33 | 40 | 41 | 42 | 43 | 44 | 45 | 46 | 47 | 48 | 49 | 50 | 51 |
|---|---|---|---|---|---|---|---|---|---|---|---|---|---|---|---|---|
| Number of teeth: : | 58 | 89 | 25 | 89 | 14 | 67 | 20 | 61 | 27 | 53 | 36 | 45 | 45 | 36 | 53 | 27 |

The speeds 1–11 are uniformly stepped with an average speed jump of $\phi = 1.25$ which is a particularly convenient starting parameter for determining all of the numbers of teeth. The numbers of teeth of the gears of the planetary transmission are so selected that in the even speeds 2, 4, 6, 8, 10, the power branching to shaft 12 of the differential transmission is 0.556 ($\phi/\phi+1$) and to shaft 13 is 0.444 ($\phi/\phi+1$). Thus the power input at shaft 11 is distributed in these proportions to the shafts 12 and 13. The positively connected gears 42, 51 of the various speeds are so determined that they give values of $\phi^7$ for gears 40 and 41, $\phi^5$ for gears 42 and 43, $\phi^3$ for gears 44 and 45, $\phi^1$ for the gears 46 and 47, $\phi^{-1}$ for the gears 48 and 49 and $\phi^{-3}$ for the gears 50 and 51.

The corresponding relationships for the reverse speeds are given by the tooth ratio of ring gear 23 to the sun gear 31 multiplied by the aforementioned values corresponding to speeds 1, 5 and 9.

Naturally, it is not necessary to make the transmission capable of having a reverse speed corresponding to all of the forward speeds and it has been found to be practical to choose reverse speeds corresponding to forward speeds, 1, 5 and 9.

From the tooth-number table above it will be apparent that both ring gears 23 and 33 have the same numbers of teeth. This has been done to permit a rational fabrication thereof.

The ability to select a reduced number of reverse speeds in the manner described permits the tolerances between the construction of the first planet set and the second planet set to be fairly large, thereby simplifying differential construction.

Figure 2:
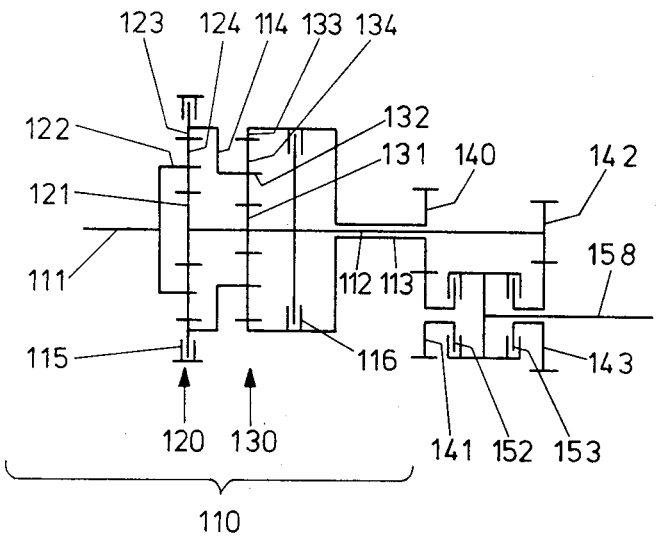
FIG. 2 is a diagram of another transmission using a modified differential and having four forward speeds and one reverse speed but also with its input shaft parallel to but laterally offset from the output shaft.

FIG. 2 shows an embodiment of the invention which is generally similar to the system of FIG. 1, albeit with a reduced number of forward and reverse speeds. Parts which perform similar functions have been indicated with the same numerals as those of FIG. 1 preceded by a one in the hundreds place. The following discussion regarding the FIG. 2 embodiment will thus deal exclusively with the differential.

The differential transmission 110 comprises four shafts 111, 112, 113 and 114. The first or input shaft 111 is connected to the planet carrier 122 of the planet set 120. The coupling between the planet sets 120 and 130 is here effected by tying the sun gears 121 and 131 together and mounting them on the common shaft 112.

The ring gear 123 of the first planet set 120 is connected to the planet carrier 132 of the second planet set 130.

Thus the first shaft 111 of the differential transmission is connected with the input element which is the first planet carrier 122, the second shaft 112 is connected with the first and second sun gears 121 and 131 constituting a pair of elements of the two planetary sets which are coupled together, the third shaft 113 is connected to another element of the third planet set 130, namely, the ring gear 133, while the fourth shaft 114 connects the other pair of elements, i.e. the ring gear 123 and the planet carrier 132. The shaft 114 can be braked relative to the housing and to the ring gear by a brake 115 which is only effective during reverse speed operation of the system. The clutch 116 performs a similar function to that of clutch 16, i.e. connects the shaft 113 to the shaft 112 or blocks the differential so that the shafts 111, 112 and 113 rotate in the same sense with the same speed.

The systems of FIGS. 1 and 2 operate similarly, so there is no need for further elucidation.

The transmissions of FIGS. 1 and 2 are so constructed that the output shafts 58 and 158 are parallel to but laterally offset from the respective input shafts 11 and 111. In many cases, however, it is desirable to have the input and output shafts coaxial with one another. Such a transmission has been shown in FIG. 3.

Figure 3:
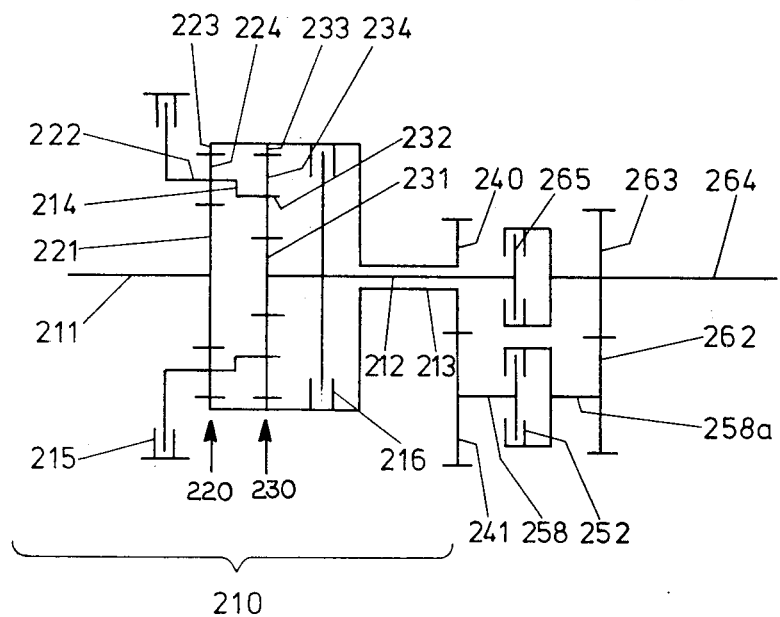
FIG. 3 is a diagram illustrating still another transmission according to the invention in which the output shaft is axially aligned with the input shaft.

The transmission of FIG. 3 differs from that of FIG. 1 by a coaxial arrangement of the clutches and their particular connection to the set of gears which mesh with one another for each stage. As has been mentioned in connection with FIG. 2, the relationship between the reference numerals of FIGS. 1 and 3 applies here as well, except that similarly functioning parts use the same reference numerals as in FIG. 1 although preceded by a 2 in the hundreds place.

In this embodiment, the input shaft 211 drives the sun gear 221 of the first planet set 220 directly. The planetary gearing is represented collectively at 210.

Sun gear 221 meshes with the planet gears 224 of a planet carrier 222 which, in the manner described in connection with FIG. 1, is connected to the planet carrier 232 of the second planet set 230. In this embodiment also, the reversing clutch or brake 215 is connected to the hollow shaft 214 which interconnects the two planet carriers. The two sun gears 223 and 233 are connected to the shaft 213 and the blocking clutch 216 can couple the shafts 212 and 213 together.

In this embodiment, shafts 258 and 258a are provided in parallel to the second and third shafts 212 and 213 but the shaft 258a does not serve as the output shaft but only as an auxiliary shaft.

The output shaft 264 is provided so as to be coaxial with the shafts 212 and 213. The shaft 212 can be connected directly by a clutch 265, with the shaft 264 or, when the clutch is disengaged, the shaft 264 can be connected via the positive displacement transmission 263, 262 with the auxiliary shaft 268a.

The clutch operations are as follows for the respective speeds:

| Speed | Actuated Clutches or Brakes | | | |
|---|---|---|---|---|
| | 215 | 216 | 252 | 265 |
| 1. | | X | X | |
| 2. | | | X | X |
| 3. | | X | | X |

-continued

| Speed | Actuated Clutches or Brakes | | | |
|---|---|---|---|---|
| | 215 | 216 | 252 | 265 |
| 1.R | X | | | X |

An X indicates the actuated state of the clutch or brake.

A fourth speed can be obtained if the clutches 260 and 265 are simultaneously actuated and this fourth speed will have a greater jump from the third speed than any other two successive speeds from one another.

We claim:

1. A gear train transmission having a plurality of speeds, said transmission comprising:

a differential having an input shaft and a pair of output shafts to which input torque is distributable, said differential comprising at least two mutually coupled planetary gear sets and having at least one coupling shaft;

each of the differential output shafts having at least one gear train connecting to a further shaft for driving said further shaft at a speed determined by the gear teeth of the gears of the respective trains whereby at least some of the transmission speeds are determined by the selective operation of respective gear trains;

respective switching clutches associated with each of said gear trains and selectively actuatable to render said gear trains operable to connect the respective differential output shaft to said further shaft; and a brake for said coupling shaft actuatable exclusively to reverse rotation of said further shaft, said differential further comprising a switching clutch for said coupling shaft actuatable to block differential action and effect joint rotation of said output shafts in the same sense.

2. The transmission defined in claim 1 wherein each of said sets includes a sun-gear element, a planet-gear element and a ring-gear element, the elements of each of said sets being differentially rotatable relative to one another about the axis of said input shaft, one of the elements of one set being coupled to one of the elements of the other set by said coupling shaft, another element of said one set and a further element of said other set being connected to one of said output shafts, the remaining element of said one set and the remaining element of said other set being connected respectively to said input shaft and the other output shaft of said differential.

3. The transmission defined in claim 2 wherein said coupling shaft interconnects both of said planet-gear elements, the input shaft is connected to the sun gear of said one of said sets, said one of said output shafts is connected to both of said ring-gear elements and the other output shaft of said differential is connected to the sun-gear element of the other set.

4. The transmission defined in claim 3 wherein said ring-gear elements have identical toothings.

5. The transmission defined in claim 2 wherein said sun-gear elements are connected together and to said one of said output shafts, the other of said output shafts being connected to the ring-gear element of said other set, said input shaft being connected to the planetary gear element of said one of said sets, said coupling shaft interconnecting the ring-gear element of said one of said sets and the planetary gear element of said other set.

6. The transmission defined in claim 2 wherein said further shaft is coaxial with said input shaft.

7. The transmission defined in claim 6 wherein said output shafts are coaxial with said input shaft.

8. The transmission defined in claim 2 wherein said further shaft is parallel to but laterally offset from the axis of said input shaft.

9. The transmission defined in claim 8 wherein said output shafts are coaxial with said input shaft.

10. The transmission defined in claim 2 wherein said switching clutch of said differential directly couples said output shafts together to block the differential.

* * * * *